H. KILLAM.
Carriage-Axle.
No. 219,160. Patented Sept. 2, 1879.
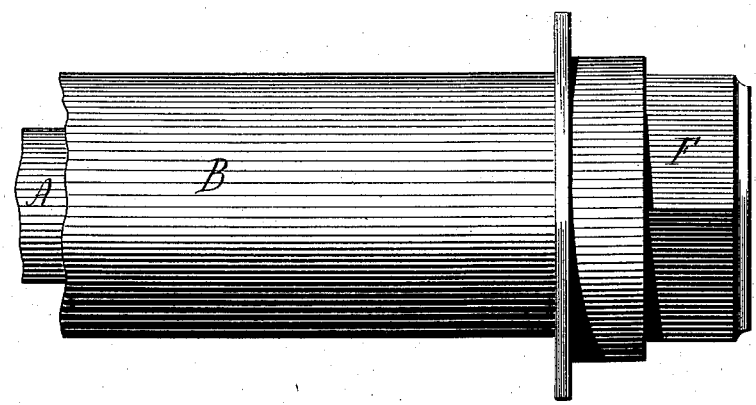
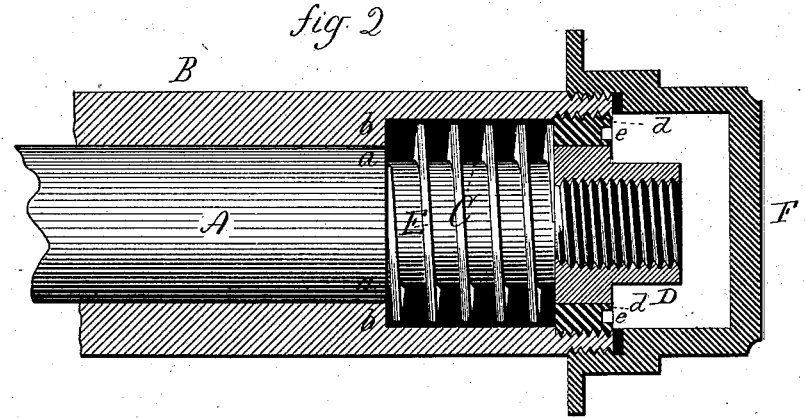

UNITED STATES PATENT OFFICE.

HENRY KILLAM, OF NEW HAVEN, CONNECTICUT.

IMPROVEMENT IN CARRIAGE-AXLES.

Specification forming part of Letters Patent No. 219,160, dated September 2, 1879; application filed August 1, 1879.

*To all whom it may concern:*

Be it known that I, HENRY KILLAM, of New Haven, in the county of New Haven and State of Connecticut, have invented a new Improvement in Axles; and I do hereby declare the following, when taken in connection with the accompanying drawings and the letters of reference marked thereon, to be a full, clear, and exact description of the same, and which said drawings constitute part of this specification, and represent, in—

Figure 1, side view; Fig. 2, longitudinal section.

This invention relates to an improvement in that class of carriage-axles in which a spring is arranged in a cavity between the axle and box at the forward end, and so as to take a bearing longitudinally on both the axle and box against an outward or inward longitudinal or axial force. In such axles it is essential that the construction be such that the spring may be easily removed. I refer particularly to the construction shown in the patent of Chas. H. Kendall, No. 212,386. In that patent the box is formed in two parts in order to make the chamber in the box, and when the spring is placed in the chamber and the box in the wheel the spring cannot be removed without taking the box from the wheel, which makes the removal of the spring impracticable; hence it is liable to soon be clogged so as to make it of little or no effect.

The object of this invention is to overcome this difficulty; and it consists in the construction, as hereinafter described, and particularly recited in the claims.

A is the axle-arm, of the usual form, except that at the forward end it is reduced for a short distance, and so as to form a shoulder, $a$; B, the box, also of usual form, except that it is recessed at the forward end to form a shoulder, $b$, in the same annular plane as the shoulder $a$ on the axle. This forms a chamber, C, between the axle and box, half of which is on the axle and half in the box.

The outer end of the box is screw-threaded on the inside to receive a correspondingly-threaded ring, $d$. The width of the ring corresponds to that of the shoulder $b$, and the said ring is provided with holes $e$, or other device to which a wrench may be applied to screw the said ring into its place in the end of the box.

On the extreme end of the axle a thread is cut to receive a nut, D, in the usual manner; and this nut is constructed and arranged so as to pass into the ring and come flush on its inner surface with the inner surface of the ring $d$, and so as to correspond with the shoulder $a$ on the axle.

E is a spiral spring arranged in the cavity C, and so as to bear at its inner end on both the shoulder $a$ of the axle and the shoulder $b$ of the box, and at its outer end on both the ring $d$ and the nut D, and so that the nut D acts as a bearing on the spring against the shoulder $b$ of the box, and the ring $d$ in like manner against the shoulder $a$ of the axle.

To introduce the spring both the nut D and ring $d$ are removed and the box placed upon the axle in the usual manner, then the spring introduced to its place, then the ring screwed in, and then the nut.

When it is desired to only remove the wheel from the axle, as for the purposes of lubrication, the nut D only is removed, as in common axles; but when it is desirable to clear the spring, or remove it for any purpose, take out both the ring and nut, and the spring is free, and without in any manner disturbing the box in the hub.

In some cases, as in coach-axles, it is desirable to cover the axle-nut. For this purpose a cap-nut, F, is fitted over and so as to screw onto the outer end of the box, which covers and nicely finishes the otherwise exposed end of the axle.

From the foregoing it will be understood that I do not broadly claim the arrangement of the spring between the axle and box, and so as to cushion or take the strain axially in either direction; but What I do claim is—

1. The combination of the axle-arm A and box B, the two recessed to form the cavity C, and corresponding shoulders, respectively, $a$ $b$, with nut D, on the axle, and ring $d$, screwed into the box to form, respectively, shoulders corresponding to the shoulders *a b*, and a spring, E, in the said cavity, substantially as and for the purpose described.

2. The combination of the axle-arm A and box B, the two recessed to form the cavity C, and corresponding shoulders, respectively, *a b*, with nut D, on the axle, and ring *d*, screwed into the box to form, respectively, shoulders corresponding to the shoulders *a b*, and a spring, E, in the said cavity, and with the covering-nut F screwed on over the end of the box, substantially as described.

HENRY KILLAM.

Witnesses:
J. H. SHUMWAY,
JOS. C. EARLE.